US012240923B2

(12) United States Patent
Rohrbach et al.

(10) Patent No.: US 12,240,923 B2
(45) Date of Patent: Mar. 4, 2025

(54) SUSPENSION PROCESS FOR PREPARING ETHYLENE POLYMERS COMPRISING WORK-UP OF THE SUSPENSION MEDIUM

(71) Applicant: Basell Polyolefine GmbH, Wesseling (DE)

(72) Inventors: Peter Rohrbach, Hofheim/Ts. (DE); Jürgen Perzlmeier, Neustadt/Donau (DE); Elke Damm, Bad Vilbel (DE); Harald Prang, Erftstadt (DE)

(73) Assignee: Basell Polyolefine GmbH, Wesseling (DE)

( * ) Notice: Subject to any disclaimer, the term of this patent is extended or adjusted under 35 U.S.C. 154(b) by 698 days.

(21) Appl. No.: 17/614,708

(22) PCT Filed: May 28, 2020

(86) PCT No.: PCT/EP2020/064792
§ 371 (c)(1),
(2) Date: Nov. 29, 2021

(87) PCT Pub. No.: WO2020/239885
PCT Pub. Date: Dec. 3, 2020

(65) Prior Publication Data
US 2022/0220233 A1    Jul. 14, 2022

(30) Foreign Application Priority Data
May 29, 2019   (EP) ..................................... 19177333

(51) Int. Cl.
*C08F 2/00*      (2006.01)
*B01D 3/14*     (2006.01)
(Continued)

(52) U.S. Cl.
CPC .............. *C08F 10/02* (2013.01); *B01D 3/143* (2013.01); *B01D 3/38* (2013.01); *B01D 17/045* (2013.01); *C08F 2/00* (2013.01)

(58) Field of Classification Search
CPC ......... C08F 2/00; C08F 110/02; C08F 210/16
See application file for complete search history.

(56) References Cited

U.S. PATENT DOCUMENTS

| 8,148,450 B2 | 4/2012 | McDonald et al. |
| 9,238,182 B2 | 1/2016 | Mignon et al. |

(Continued)

FOREIGN PATENT DOCUMENTS

| CN | 102482368 A | 5/2012 |
| CN | 103080147 A | 5/2013 |

(Continued)

OTHER PUBLICATIONS

The International Search Report and Written Opinion for PCT/EP2020/064792 mailed Sep. 15, 2020.

(Continued)

*Primary Examiner* — Caixia Lu (57) ABSTRACT

A process for preparing an ethylene polymer in a suspension polymerization including the steps of separating the formed suspension of ethylene polymer particles in a solid-liquid separator into wet ethylene polymer particles and mother liquor, transferring a part of the mother liquor into a work-up section including an evaporator for producing a wax-depleted portion of the mother liquor, a diluent distillation unit for producing isolated diluent from the wax-depleted portion of the mother liquor, and a wax removal unit operated by direct steam distillation for producing a gaseous hydrocarbon/steam mixture which is condensed and then separated into an aqueous phase and a hydrocarbon phase, wherein a first part of the hydrocarbon phase is transferred to the (Continued)

diluent distillation unit without passing the evaporator for producing the wax-depleted portion of the mother liquor.

19 Claims, 2 Drawing Sheets

(51) Int. Cl.
*B01D 3/38* (2006.01)
*B01D 17/04* (2006.01)
*C08F 10/02* (2006.01)
*C08F 110/00* (2006.01)
*C08F 210/16* (2006.01)

(56) References Cited

U.S. PATENT DOCUMENTS

| | | | |
|---|---|---|---|
| 11,834,531 B2 * | 12/2023 | Damm | C08F 2/001 |
| 2001/0025088 A1 * | 9/2001 | Marissal | B01J 8/0055 |
| | | | 526/348.5 |
| 2018/0022842 A1 | 1/2018 | Damm et al. | |
| 2018/0327529 A1 | 11/2018 | Sleijster et al. | |
| 2022/0227903 A1 * | 7/2022 | Rohrbach | C08F 110/02 |

FOREIGN PATENT DOCUMENTS

| | | |
|---|---|---|
| EA | 200200081 A3 | 10/2002 |
| EP | 905152 A1 | 3/1999 |
| JP | H06293805 A | 10/1994 |
| JP | H11158227 A | 6/1999 |
| JP | 2007514813 A | 6/2007 |
| JP | 2017524052 A | 8/2017 |
| RU | 2371449 C2 | 10/2009 |
| RU | 2623433 C2 | 6/2017 |
| WO | 2010136202 A1 | 12/2010 |
| WO | 2012028591 A1 | 3/2012 |
| WO | 2016023973 A1 | 2/2016 |
| WO | 2017108951 A1 | 6/2017 |
| WO | 2018104080 A1 | 6/2018 |

OTHER PUBLICATIONS

Frank P. Alt et al., Bimodal Polyethylene—Interplay of Catalyst and Process, Macromol. Symp. 2001, 163, 135-143.

* cited by examiner

Fig. 1

Fig. 2 ated into a second aqueous phase and a second hydrocarbon
SUSPENSION PROCESS FOR PREPARING ETHYLENE POLYMERS COMPRISING WORK-UP OF THE SUSPENSION MEDIUM This application is the U.S. National Phase of PCT International Application PCT/EP2020/064792, filed May 28, 2020, claiming benefit of priority to European Patent Application No. 19177333.2, filed May 29, 2019, the disclosures of which are incorporated herein by reference in their entirety.

FIELD OF THE INVENTION

In general, the present disclosure relates to the field of chemistry. More specifically, the present disclosure relates to polymer chemistry. In particular, the present disclosure relates to a process for preparing an ethylene polymer in a suspension polymerization in a polymerization reactor or a series of polymerization reactors.

BACKGROUND OF THE INVENTION

In some instances, suspension processes are used for preparing ethylene polymers. In some instances, such processes are carried out in a series of reactors and so allow to set different reaction conditions in the polymerization reactors, thereby producing different polymer compositions in the individual polymerization reactors. In some instances, suspension processes for preparing ethylene polymers employ a hydrocarbon or a hydrocarbon mixture as diluent. The suspension medium, which forms the liquid or supercritical phase of the suspension, is made from or containing the diluent and components like dissolved ethylene, comonomers, aluminum alkyls, and hydrogen and dissolved reaction products like oligomers and waxes.

In some instances, not consumed components of the reaction mixture like the diluent or non-polymerized monomers or comonomers are recycled to the polymerization process. The separation of the produced polyethylene particles from the formed suspension results in wet ethylene polymer particles and separated suspension medium, which may be referred to as "mother liquor." In some instances, the polymer particles are dried in a powder dryer, using a hot gas stream such as a hot nitrogen stream. The hydrocarbons contained in the hot gas stream are thereafter separated from the hot gas stream and transferred into a liquid hydrocarbon recover stream, which is returned to the polymerization.

In some instances, the mother liquor is recycled directly to the polymerization process. However, to remove side products of the polymerization reaction which are soluble in the suspension medium from the polymerization process, a part of the mother liquor has to be worked up. In some instances, another reason for working up the mother liquor is that the suspension obtained after the final reactor of a series of polymerization reactors contains components which should not be introduced into one of the previous polymerization reactors for producing polyethylenes with specific property combinations. The mother liquor to be worked up is a multi-component mixture. Accordingly, various separation steps such as evaporation or distillation steps remove unwanted components and split those constituents intended to be recycled to the polymerization process. Finally, the diluent is purified in adsorbers and fed back into the process.

SUMMARY OF THE INVENTION

In a general embodiment, the present disclosure provides a process for preparing an ethylene polymer in a suspension polymerization in a polymerization reactor or a series of polymerization reactors including the steps of polymerizing ethylene or copolymerizing ethylene and one or more $C_3$-$C_{12}$-1-alkenes at temperatures of from 40 to 150° C. and pressures of from 0.1 to 20 MPa in the presence of a polymerization catalyst and forming a suspension of ethylene polymer particles in a suspension medium made from or containing a hydrocarbon diluent, transferring the suspension of ethylene polymer particles into a solid-liquid separator, wherein the suspension is separated into wet ethylene polymer particles and mother liquor, transferring a first part of the mother liquor into a work-up section including an evaporator for producing a wax-depleted portion of the mother liquor, a diluent distillation unit for producing isolated diluent from the wax-depleted portion of the mother liquor, and a wax removal unit operated by direct steam distillation for removing wax from a hydrocarbon wax solution, which wax removal unit produces a gaseous hydrocarbon/steam mixture which is condensed and then separated, within a first liquid-liquid separator, into an aqueous phase and a hydrocarbon phase, and recycling a first part of the isolated diluent produced in the diluent distillation unit to the polymerization reactor or the series of polymerization reactors, wherein a first part of the hydrocarbon phase obtained in the first liquid-liquid separator is transferred to the diluent distillation unit without passing the evaporator for producing the wax-depleted portion of the mother liquor.

In some embodiments, the first part of the hydrocarbon phase obtained in the first liquid-liquid separator is transferred directly to the diluent distillation unit.

In some embodiments, the first part of the hydrocarbon phase obtained in the first liquid-liquid separator is transferred to a second liquid-liquid separator and therein separated into a second aqueous phase and a second hydrocarbon phase. In some embodiments, the second hydrocarbon phase is transferred to the diluent distillation unit.

In some embodiments, the second liquid-liquid separator is equipped with a coalescer.

In some embodiments, the aqueous phase withdrawn from the second liquid-liquid separation vessel is returned to the first liquid-liquid separation vessel.

In some embodiments, the wet ethylene polymer particles obtained in the solid-liquid separator are dried by contacting the particles with a gas stream, thereby forming a gas stream carrying a hydrocarbon load, and thereafter separating the hydrocarbon load from the gas stream, thereby forming a liquid hydrocarbon recover stream, and a first part of the hydrocarbon recover stream is transferred to the diluent distillation unit without passing the evaporator for producing the wax-depleted portion of the mother liquor.

In some embodiments, the hydrocarbon recover stream transferred to the diluent distillation unit is passed through a filter before being introduced into the diluent distillation unit.

In some embodiments, the filter is a backwash filter.

In some embodiments, the ethylene polymer particles, which are separated from the hydrocarbon recover stream by the backwash filter, are transferred by a part of the hydrocarbon recover stream to the suspension of ethylene polymer particles upstream of the solid-liquid separator.

In some embodiments, the hydrocarbon recover stream is formed by contacting the gas stream carrying the hydrocarbon load with a cooled liquid phase in a scrubber and withdrawing the hydrocarbon recover stream from the bottom of the scrubber. In some embodiments, the cooled liquid phase, which is introduced into the scrubber for being contacted with the gas stream carrying the hydrocarbon load, is a cooled part of the hydrocarbon recover stream withdrawn from the bottom of the scrubber.

In some embodiments, the prepared ethylene polymer is a multimodal ethylene copolymer.

In some embodiments, the preparation of the ethylene polymer is carried out in a series of polymerization reactors. In some embodiments, an ethylene homopolymer is prepared in one of the polymerization reactors.

In some embodiments, the ethylene homopolymer is prepared in the first polymerization reactor of the series of polymerization reactors. In some embodiments, a copolymer of ethylene is prepared in a subsequent polymerization reactor.

DETAILED DESCRIPTION OF THE INVENTION

In a general embodiment, the present disclosure provides a process for preparing an ethylene polymer in a suspension polymerization in a polymerization reactor or in a series of polymerization reactors. In some embodiments, the ethylene polymers are prepared by polymerizing ethylene or copolymerizing ethylene and one or more $C_3$-$C_{12}$-1-alkenes in the presence of a polymerization catalyst. In some embodiments, the $C_3$-$C_{12}$-1-alkenes are linear or branched, alternatively linear $C_3$-$C_{10\text{-}1}$-alkenes or branched $C_2$-$C_{10}$-1-alkenes. In some embodiments, the linear $C_3$-$C_{10\text{-}1}$-alkenes are selected from the group consisting of propylene, 1-butene, 1-pentene, 1-hexene, 1-heptene, 1-octene, and 1-decene. In some embodiments, the branched $C_2$-$C_{10}$-1-alkenes are 4-methyl-1-pentene. In some embodiments, the ethylene is polymerized with mixtures of two or more $C_3$-$C_{12}$-1-alkenes. In some embodiments, comonomers are $C_3$-$C_8$-1-alkenes. In some embodiments, the $C_3$-$C_8$-1-alkenes are selected from the group consisting of 1-butene, 1-pentene, 1-hexene, 1-heptene and 1-octene. In some ethylene copolymers, the amount of units derived from incorporated comonomers is from 0.01 wt. % to 25 wt. %, alternatively from 0.05 wt. % to 15 wt. %, alternatively from 0.1 wt. % to 12 wt. %. In some embodiments, ethylene is copolymerized with from 0.1 wt. % to 12 wt. % of 1-hexene and/or 1-butene, alternatively from 0.1 wt. % to 12 wt. % of 1-butene.

In some embodiments, the polymerization is carried out using olefin polymerization catalysts. In some embodiments, the polymerization is carried out using Phillips catalysts based on chromium oxide, titanium-based Ziegler- or Ziegler-Natta-catalysts, single-site catalysts, or mixtures of such catalysts. As used herein, the term "single-site catalysts" refers to catalysts based on chemically uniform transition metal coordination compounds. In some embodiments, mixtures of two or more of these catalysts may be alternatively designated as "hybrid catalysts."

In some embodiments, the catalysts are of the Ziegler type. In some embodiments, the Ziegler-type catalysts are made from or containing a compound of titanium or vanadium, a compound of magnesium and optionally an electron donor compound and/or a particulate inorganic oxide as a support material.

In some embodiments, catalysts of the Ziegler type are polymerized in the presence of a cocatalyst. In some embodiments, the cocatalysts are organometallic compounds of metals of Groups 1, 2, 12, 13 or 14 of the Periodic Table of Elements, alternatively organometallic compounds of metals of Group 13, alternatively organoaluminum compounds. In some embodiments, the cocatalysts are selected from the group consisting of organometallic alkyls, organometallic alkoxides, and organometallic halides.

In some embodiments, the organometallic compounds are selected from the group consisting of lithium alkyls, magnesium or zinc alkyls, magnesium alkyl halides, aluminum alkyls, silicon alkyls, silicon alkoxides and silicon alkyl halides. In some embodiments, the organometallic compounds are selected from the group consisting of aluminum alkyls and magnesium alkyls. In some embodiments, the organometallic compounds are aluminum alkyls, alternatively trialkylaluminum compounds or compounds of this type wherein an alkyl group is replaced by a halogen atom. In some embodiments, the halogen is chlorine or bromine. In some embodiments, the aluminum alkyls are selected from the group consisting of trimethylaluminum, triethylaluminum, tri-isobutylaluminum, tri-n-hexylaluminum, diethylaluminum chloride and mixtures thereof.

In some embodiments, the polymerization process is carried out in suspension. As used herein, the term "suspension polymerizations" may alternatively be designated "slurry polymerizations." The suspension polymerizations take place in a medium, which is in liquid or in supercritical state under the conditions in the respective polymerization reactor and wherein the produced ethylene polymer is insoluble and forms solid particles. As used herein, the term "suspension medium" is alternatively used to denote the medium. In some embodiments, the solids content of the suspension is in the range of from 10 to 80 wt. %, alternatively from 20 to 40 wt. %.

In some embodiments, the suspension medium, which forms the liquid or supercritical phase of the suspension, is made from or containing, as main component, a diluent and further components. In some embodiments, the further components are selected from the group consisting of dissolved monomers or comonomers, dissolved cocatalysts or scavengers, dissolved reaction auxiliaries, and dissolved reaction products of the polymerization reaction. In some embodiments, the dissolved cocatalysts or scavengers are aluminum alkyls. In some embodiments, the dissolved reaction auxiliaries are hydrogen. In some embodiments, the dissolved reaction products of the polymerization reaction are oligomers or waxes. In some embodiments, the diluents are inert, that is, do not decompose under reaction conditions. In some embodiments, the diluents are hydrocarbons having from 3 to 12 carbon atoms. In some embodiments, the saturated hydrocarbons are selected from the group consisting of isobutane, butane, propane, isopentane, pentane, hexane, octane, and a mixture of these. In some embodiments, the diluent is a hydrocarbon mixture. In some embodiments, hydrocarbon mixtures have a boiling point range.

In some embodiments, the diluent has a boiling point different from the boiling points of the monomers and comonomers, thereby permitting recovery of starting materials from a mixture by distillation. In some embodiments, the diluents are hydrocarbons having a boiling point above 40° C., alternatively above 60° C., or mixtures made from or containing hydrocarbons. In some embodiments, the polymerization takes place in a liquid suspension medium made from or containing more than 50 wt. % of saturated hydrocarbons having a boiling point of above 60° C. at 0.1 MPa, alternatively more than 80 wt. % of saturated hydrocarbons having a boiling point of above 60° C. at 0.1 MPa.

In some embodiments, the process is carried out using a suspension polymerization processes at temperatures in the range from 40 to 150° C., alternatively from 50 to 130° C., alternatively from 60 to 90° C. In some embodiments, the process is carried out using a suspension polymerization processes under pressures of from 0.1 to 20 MPa, alternatively from 0.3 to 5 MPa.

In some embodiments, the polymerization is carried out in a series of at least two polymerization reactors which are connected in series. In some embodiments, the reactors are loop reactors or stirred tank reactors. There is no limit to the number of reactors of such a series. In some embodiments, the series consist of two, three or four reactors, alternatively two or three reactors. In some embodiments, a series of polymerization reactors is used and the polymerization conditions in the polymerization reactors differ. In some embodiments, the polymerization conditions differ by the nature of comonomers, the amount of comonomers, or concentrations of polymerization auxiliaries such as hydrogen. In some embodiments, the polymerization is a suspension polymerization in stirred tank reactors.

In some embodiments, the ethylene polymers are obtained as powder. As used herein, the term "powder" refers to in the form of small particles. In some embodiments, the particles have a morphology and size, which depend on the catalyst morphology, the catalyst size, and polymerization conditions. In some embodiments and depending on the catalyst used, the particles of the polyolefin powder have a mean diameter of from a few hundred to a few thousand micrometers. In some embodiments and with chromium catalysts, the mean particle diameter is from about 300 to about 1600 μm. In some embodiments and with Ziegler type catalysts, the mean particle diameter is from about 50 to about 3000 μm. In some embodiments, the polyolefin powders have a mean particle diameter of from 100 to 250 μm. In some embodiments, the particle size distribution is determined by sieving, alternatively by vibrating sieve analysis or sieve analysis under an air jet.

In some embodiments, the density of ethylene polymers obtained by the process is from 0.90 g/cm³ to 0.97 g/cm³. In some embodiments, the density is in the range of from 0.920 to 0.968 g/cm³, alternatively from 0.945 to 0.965 g/cm³. As used herein, the term "density" refers to the density determined according to DIN EN ISO 1183-1:2004, Method A (Immersion) with compression molded plaques of 2 mm thickness which were pressed at 180° C., 20 MPa for 8 minutes with subsequent crystallization in boiling water for 30 minutes.

In some embodiments, the polyethylenes have a $MFR_{21.6}$ at a temperature of 190° C. under a load of 21.6 kg, determined according to DIN EN ISO 1133:2005, condition G, from 0.5 to 300 g/10 min, alternatively from 1 to 100 g/10 min, alternatively from 1.2 to 100 g/10 min, alternatively from 1.5 to 50 g/10 min.

In some embodiments, the ethylene polymers are monomodal, bimodal or multimodal ethylene polymers. In some embodiments, the ethylene polymers are bimodal or multimodal ethylene polymers. As used herein, the term "multimodal" refers to the modality of the obtained ethylene copolymer and indicates that the ethylene copolymer is made from or containing at least two fractions of polymer which are obtained under different reaction conditions, independently whether this modality is recognized as separated maxima in a gel permeation chromatography (GPC) curve or not. In some embodiments, the different polymerization conditions are achieved by using different hydrogen concentrations or different comonomer concentrations in different polymerization reactors. In some embodiments, the polymers are obtained from polymerizing olefins in a series of two or more polymerization reactors under different reaction conditions. In some embodiments, the bimodal or multimodal polyolefins are obtained by employing mixed catalysts. In some embodiments and in addition to the molecular weight distribution, the polyolefin has a comonomer distribution. In some embodiments, the average comonomer content of polymer chains with a higher molecular weight is higher than the average comonomer content of polymer chains with a lower molecular weight. As used herein, the term "multimodal" also includes "bimodal".

In some embodiments, the polymerization is carried out in a series of polymerization reactors. In some embodiments, an ethylene homopolymer is prepared in the first polymerization reactor and an ethylene copolymer is prepared in a subsequent polymerization reactor. In some embodiments, the ethylene homopolymer is a low molecular weight ethylene homopolymer. In some embodiments, the ethylene copolymer is a high molecular weight ethylene copolymer. In some embodiments and to prepare an ethylene homopolymer in the first polymerization reactor, no comonomer is fed to the first polymerization reactor, neither directly nor as component of a feed stream or a recycle stream which is introduced into the first polymerization reactor of the series of polymerization reactors. In some embodiments, the obtained multimodal ethylene copolymers is made from or containing from 35 to 65% by weight of ethylene homopolymer prepared in the first polymerization reactor and from 35 to 65% by weight of ethylene copolymer prepared in the subsequent polymerization reactor. In some embodiments, the series of polymerization reactors includes one are more prepolymerization reactors and the prepolymerization is carried without adding comonomers.

In some embodiments, the ethylene polymer is prepared in a series of three polymerization reactors, that is, in a first polymerization reactor and two subsequent polymerization reactors, wherein the ethylene polymer prepared in the first polymerization reactor is an ethylene homopolymer, the polyethylene prepared in one of the subsequent polymerization reactors is a first ethylene copolymer, and the polyethylene prepared in the other subsequent polymerization reactor is a second ethylene copolymer of a higher molecular weight. In some embodiments, the ethylene homopolymer is a low molecular weight ethylene homopolymer. In some embodiments, the first ethylene copolymer is a high molecular weight copolymer. In some embodiments, the second ethylene copolymer of a higher molecular weight is an ultrahigh molecular weight copolymer. In some embodiments, the obtained multimodal ethylene copolymers is made from or containing from 30 to 60% by weight, alternatively from 45 to 55% by weight, of ethylene homopolymer prepared in the first polymerization reactor, from 30 to 65% by weight, alternatively from 20 to 40% by weight, of a first ethylene copolymer prepared in one subsequent polymerization reactor, and from 1 to 30% by weight, alternatively from 15 to 30% by weight, of a higher molecular weight second ethylene copolymer prepared in the other subsequent polymerization reactor.

In the process, the suspension of ethylene polymer formed in the polymerization reactor or the series of polymerization reactors is transferred into a solid-liquid separator, wherein the ethylene polymer particles are separated from the suspension medium. In some embodiments, this separation into ethylene polymer particles and mother liquor is carried out in centrifuges, decanters, filters or combinations thereof. In some embodiments, the solid-liquid separator is a centrifuge. In some embodiments, the suspension withdrawn from the polymerization reactor or the series of polymerization reactors is first transferred into a separator feed vessel and then conveyed from the separator feed vessel to the solid-liquid separator.

As used herein, the term "mother liquor" refers to the separated suspension medium obtained from the suspension in the solid-liquid separator. In some embodiments, the mother liquor is made from or containing more than 70 wt. % of diluent. In some embodiments, the components of the mother liquor also include ethylene, comonomers, aluminum alkyls, and hydrogen and dissolved reaction products like oligomers and waxes. As used herein, the term "oligomer" refers to hydrocarbons which have a higher molecular weight than the diluent and the comonomer or the comonomers and which are liquid at standard pressure and room temperature. As used herein, the term "wax" refers to hydrocarbons which are dissolved in the mother liquor and which are, after evaporation of the diluent and the oligomers, solid at standard pressure and room temperature. In some embodiments, the mother liquor is made from or containing from 75 to 99 wt. %, alternatively from 80 to 98 wt. %, diluent; from 1 to 20 wt. %, alternatively from 2 to 10 wt. %, oligomers; from 0 to 5 wt. %, alternatively from 0.3 to 3 wt. %, comonomer or comonomers; from 0 to 3 wt. %, alternatively from 0.2 to 2 wt. %, waxes; from 0 to 1 wt. %, alternatively from 0.001 to 0.1 wt. %, ethylene; from 0 to 0.1 wt. % hydrogen; and from 0.1 to 2.5 mmol/l aluminum alkyls or reaction products of aluminum alkyls.

In some embodiments, the ethylene polymer particles obtained in the solid-liquid separator contain suspension medium, that is, the ethylene polymer particles are "wet". In some embodiments, the wet ethylene polymer particles contain from 15 wt. % to 40 wt. %, alternatively from 20 wt. % to 35 wt. %, of suspension medium, that is, of mother liquor. In some embodiments, the separated ethylene polymer particles are dried by contacting the particles with a gas stream, thereby forming a gas stream carrying a hydrocarbon load. In some embodiments, the drying occurs in equipment wherein a powder is contacted, alternatively contacted countercurrently with a gas stream, for taking up suspension medium attached to or included in the ethylene polymer particles. In some embodiments, powder dryers are operated with hot nitrogen which is circulated in a closed loop. In some embodiments, drying is carried out in a two-stage dryer, wherein residual suspension medium is stripped from the ethylene polymer particles in two subsequent stages. In some embodiments, dried ethylene polymer particles are pneumatically conveyed to an extrusion section, wherein additives are added and the mixture is molten, homogenized and pelletized. In some embodiments, the dried ethylene polymer particles coming from the powder dryer first pass a degassing unit and/or a powder treatment unit before being conveyed to the extrusion section.

In some embodiments, the hydrocarbon load taken up by the gas stream for drying the wet ethylene polymer particles is subsequently separated from the gas stream, thereby forming a liquid hydrocarbon recover stream. In some embodiments, the separation occurs by condensation. In some embodiments, the hydrocarbon load is separated from the gas stream in a scrubber into which a cooled liquid phase is introduced. In some embodiments, the liquid phase, which has taken up the hydrocarbon load from the gas stream coming from the dryer, forms the liquid hydrocarbon recover stream. The liquid hydrocarbon recover stream is withdrawn from the bottom of the scrubber. A part of the liquid hydrocarbon recover stream is returned to the scrubber as cooled liquid phase after having passed a cooler. At least a part of the remaining portion of the liquid hydrocarbon recover stream withdrawn from the bottom of the scrubber is returned to the polymerization process.

In some embodiments, the gas stream coming from the dryer passes a particle removing equipment before the hydrocarbon load is separated from the gas stream. In some embodiments, the particle removing equipment is a filter or a cyclone.

In some embodiments, a major portion of the mother liquor is recycled to the polymerization reactor or the series of polymerization reactors. In some embodiments, the polymerization is carried out in a series of polymerization reactors, which are provided with recycled parts of the mother liquor. In some embodiments, from 90 to 99.99 wt. %, alternatively from 95 to 99.5 wt. %, alternatively from 98 to 99 wt. %, of the mother liquor are recycled to the polymerization reactor or the series of polymerization reactors. In some embodiments, the parts of the mother liquor which are not recycled include continuous flushings of pumps, off-gas vented to purge gaseous impurities of the feed streams or gaseous by-products of the polymerization process, or dissolved reaction products. In some embodiments, the dissolved reaction products are waxes intentionally removed from the mother liquor.

In some embodiments, the mother liquor is first fed to a mother liquor collecting vessel. In some embodiments and for recycling to the polymerization process, the mother liquor is withdrawn from the mother liquor collecting vessel.

In some embodiments, the mother liquor is recycled to the polymerization reactor or the series of polymerization reactors as such. In some embodiments, the mother liquor is recycled in worked-up form. In some embodiments, a part of the mother liquor is worked up in a work-up section for producing worked-up components of the mother liquor. As used herein, the term "work-up" refers to a composition is separated in one or more separated compositions or that one or more components of a composition are removed from the composition and a purified composition void of or depleted in the removed component(s) is obtained. In some embodiments, a work-up results in isolating individual components of the composition. In some embodiments, a work-up process includes removing components of the mother liquor, which have a boiling point lower than the boiling point of the diluent. In some embodiments, the removed components are selected from the group consisting of ethylene and 1-butene. In some embodiments, a work-up process includes removing components of the suspension medium, which have a boiling point higher than the boiling point of the diluent. In some embodiments, the removed components are selected from the group consisting of oligomers and waxes. In some embodiments, the amount of mother liquor, which passes the work-up section, is from 1 to 90 wt. %, alternatively from 5 to 80 wt. %, of the mother liquor recycled to the series of polymerization reactors. In some embodiments of the work-up process, the mother liquor is separated in two or more components which are recycled to the polymerization in individual recycle circuits. In some embodiments and after the separation, each of the individual recycle circuits includes further purification steps. In some embodiments, components of the mother liquor are recycled to the series of polymerization reactors in individual recycle circuits and made from or containing the diluent, ethylene and comonomers. In some embodiments, the worked-up components of the mother liquor are transferred to another polymerization reactor used for carrying out the polymerization.

In some embodiments, the work-up section for working up the mother liquor includes an evaporator for producing a wax-depleted portion of the mother liquor. In some embodiments, a part of the mother liquor to be worked up is transferred into the evaporator and separated into lower boiling point components, which are withdrawn in gaseous form from the evaporator, and a remaining part depleted in lower boiling point components. In some embodiments, the evaporated part withdrawn from the evaporator is subsequently condensed and transferred as wax-depleted portion of the mother liquor to the diluent distillation unit. In some embodiments, the liquid phase depleted in lower boiling point components, which is withdrawn from the evaporator, is conveyed as hydrocarbon wax solution to a wax removal unit. In some embodiments, the evaporator is a circulation evaporator operated by circulating the liquid phase to be evaporated through an external heat exchanger wherein the liquid phase is partly vaporized.

For further working up the wax-depleted portion of the mother liquor, the work-up section includes a diluent distillation unit for producing isolated diluent from the wax-depleted portion of the mother liquor. In some embodiments and in the diluent distillation unit, lower boiling point components of the mother liquor are separated from the diluent by a distillation step. In some embodiments, lower boiling point components are selected from the group consisting of ethylene, hydrogen, those comonomers which have a lower or a similar boiling point than the used diluent, and parts of the diluent. In some embodiments, n-hexane or a mixture of hexane isomers is used as diluent, 1-butene is used as comonomer, and the major portion of the 1-butene of the mother liquor forms a part of the lower boiling point components separated from the diluent in the diluent distillation unit. In some embodiments, a major portion of the lower boiling point components of the mother liquor are recycled to the polymerizations in individual recycle circuits. In some embodiments, a major portion of the lower boiling point components are recycled after having passed one or more further work-up steps.

In some embodiments, the higher boiling point components of the mother liquor are separated from the diluent by a distillation step. In some embodiments, the higher boiling point components are comonomers, which have a boiling point similar to or higher than that of the used diluent. In some embodiments, a major portion of the higher boiling point components obtained by the distillation are recycled to the polymerizations. In some embodiments, a major portion of the higher boiling point components are recycled after having passed one or more further work-up steps.

The isolated diluent produced within the diluent distillation unit is at least partly recycled to the polymerization reactor or the series of polymerization reactors. In some embodiments, the isolated diluent is recycled to a polymerization reactor wherein an ethylene homopolymer is prepared.

In some embodiments, from 5 to 70 wt. % of the mother liquor, which is recycled to the polymerization reactor or the series of polymerization reactors, are recycled as isolated diluent to the polymerization reactor or the series of polymerization reactors, alternatively from 10 to 60 wt. %, alternatively from 15 to 50 wt. %, of the mother liquor are recycled as isolated diluent to the polymerization reactor or the series of polymerization reactors.

In some embodiments, the isolated diluent passes one or more purification steps, thereby obtaining a purified diluent, before being recycled to the polymerization reactor or the series of polymerization reactors. In some embodiments, the diluent purification steps are selected from the group consisting of a purification by adsorption, a purification by absorption, a catalytic hydrogenation, and a purification by a membrane purification process.

In some embodiments, the work-up section for working up the mother liquor is further made from or containing a wax removal unit for removing wax from a hydrocarbon wax solution which is operated by direct steam distillation, that is, by injecting steam directly into a vessel containing a hydrocarbon wax solution from which wax is removed. By injecting steam, a gaseous hydrocarbon/steam mixture, which is made from or containing primarily diluent and steam, is produced in the wax removal unit. In some embodiments, wax withdrawn from the polymerization process is combusted for generating energy or sold as by-product of the polymerization process.

In some embodiments, the hydrocarbon wax solution from which the wax is removed is not mother liquor as obtained in the solid-liquid separator but a liquid phase which was obtained by withdrawing lower boiling point components from the mother liquor. In some embodiments, the separation of mother liquor in lower boiling point components and a remaining part depleted in lower boiling point components occurs by an evaporating step wherein a part of the mother liquor is evaporated. In some embodiments, the evaporated part of the mother liquor obtained in the evaporating step is subsequently condensed and transferred as wax-depleted portion of the mother liquor to the diluent distillation unit. In some embodiments, the remaining liquid phase depleted in lower boiling point components is conveyed as hydrocarbon wax solution to the wax removal unit.

In some embodiments, the gaseous hydrocarbon/steam mixture obtained in the wax removal unit is withdrawn from the wax removal unit, condensed and transferred into a first liquid-liquid separator, wherein the mixture is separated in an aqueous phase and a hydrocarbon phase. In some embodiments, the aqueous phase obtained in the first liquid-liquid separator is discarded.

In some embodiments, parts of the hydrocarbon phase obtained in the first liquid-liquid separator is recycled to a stage of the mother liquor work-up process upstream of the evaporator for producing the wax-depleted portion of the mother liquor. In some embodiments, parts of the hydrocarbon phase obtained in the first liquid-liquid separator is recycled to a stage of the mother liquor work-up process by adding to the mother liquor transferred into the work-up section. In some embodiments, at least a part of the hydrocarbon phase obtained in the first liquid-liquid separator is transferred to the diluent distillation unit without passing the evaporator for producing the wax-depleted portion of the mother liquor. In some embodiments and by not adding part of the hydrocarbon phase obtained in the first liquid-liquid separator to the mother liquor upstream of a step, wherein the mother liquor is depleted in lower boiling point components, but transferring the hydrocarbon phase obtained in the first liquid-liquid separator to the diluent distillation unit, the amount of liquid to be evaporated is decreased, thereby producing a wax-depleted portion of the mother liquor. In some embodiments, the evaporator or an equivalent equipment is smaller without reducing the amount of isolated diluent. In some embodiments, the hydrocarbon phase obtained in the first liquid-liquid separator is transferred to the diluent distillation unit without passing the evaporator for producing the wax-depleted portion of the mother liquor. In some embodiments, the hydrocarbon phase obtained in the first liquid-liquid separator was evaporated and then condensed.

In some embodiments, the part of the hydrocarbon phase obtained in the first liquid-liquid separator, which is transferred to the diluent distillation unit without passing the evaporator for producing the wax-depleted portion of the mother liquor, is directly transferred to the diluent distillation unit.

In some embodiments, the part of the hydrocarbon phase obtained in the first liquid-liquid separator, which is transferred to the diluent distillation unit without passing the evaporator for producing the wax-depleted portion of the mother liquor, is passed through a second liquid-liquid separator and therein further depleted in water content by separating into a second aqueous phase and a second hydrocarbon phase. In some embodiments, the second hydrocarbon phase is transferred to the diluent distillation unit. In some embodiments, the aqueous phase withdrawn from the second liquid-liquid separation vessel is returned to the first liquid-liquid separation vessel. In some embodiments, disturbances within the first liquid-liquid separator with regard to the separation performance are caught up by the second liquid-liquid separator, preventing a breakthrough of too much water into the distillation unit and affecting the quality of the isolated diluent exiting the distillation unit.

In some embodiments, the second liquid-liquid separator is equipped with a coalescer. As used herein, the term "coalescer" refers to a technological device used to facilitate the separation of emulsions, such as hydrocarbon/water mixtures, into their components.

In some embodiments, the first liquid-liquid separator, the second liquid-liquid separator, or both are equipped with level and separation layer measurement devices which use high frequency microwave impulses along a rod sensor which are reflected from the respective layer surface. In some embodiments, the time between sending and receiving is used for the level indication.

In some embodiments, the wet ethylene polymer particles obtained in the solid-liquid separator are dried by contacting the particles with a gas stream, thereby forming a gas stream carrying a hydrocarbon load. In some embodiments, thereafter, the hydrocarbon load is separated from the gas stream, thereby forming a liquid hydrocarbon recover stream. In some embodiments, at least a part of the hydrocarbon recover stream is transferred to the diluent distillation unit without passing the evaporator for producing the wax-depleted portion of the mother liquor. In some embodiments, the transfer of the hydrocarbon recover stream to the diluent distillation unit further decreases the amount of liquid to be evaporated, thereby producing a wax-depleted portion of the mother liquor and reducing the energy consumption in this unit.

In some embodiments, the hydrocarbon recover stream is first passed through a filter before being introduced into the diluent distillation unit, thereby preventing the transference into the diluent distillation unit of fine ethylene polymer particles, which are entrained in the drying gas coming from the powder dryer and end-up in the hydrocarbon recover stream. In some embodiments, the filter is a backwash filter, alternatively an automatic backwash filter. In some embodiments, the self-cleaning filters utilize backwashing to clean the screen without interrupting the system flow. In some embodiments, ethylene polymer particles, which are separated from the hydrocarbon recover stream by the backwash filter, are transferred by a part of the hydrocarbon recover stream to the suspension of ethylene polymer particles before being fed into the solid-liquid separator. In some embodiments, ethylene polymer particles are transferred to the separator feed vessel.

Figure 1:
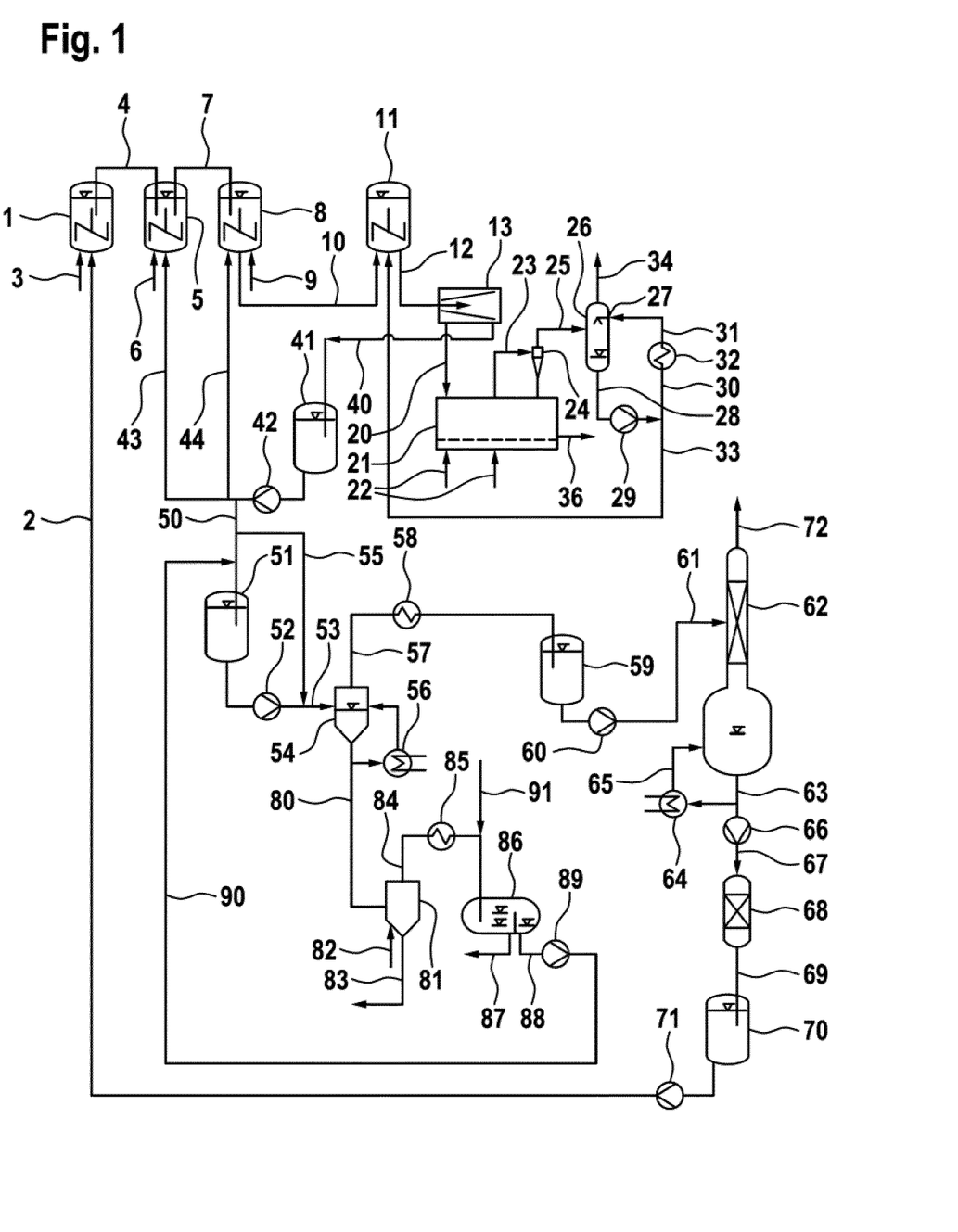
FIG. 1 is a schematic of a process for preparing ethylene polymers in suspension.

FIG. 1 is a schematic of a process for preparing multimodal ethylene polymers in a series of three polymerization reactors by a suspension polymerization process using hexane as diluent.

For homopolymerizing ethylene or copolymerizing ethylene with other olefins in a first polymerization reactor (1) in suspension, recycled hexane is fed to the reactor (1) via feeding line (2). The other components of the reaction mixture like catalyst, ethylene and polymerization auxiliaries and optional components like possible comonomers and/or directly recycled mother liquor are fed to the reactor via one or more feeding lines (3).

As result of the polymerization in reactor (1), a suspension of solid ethylene polymer particles in a suspension medium is formed. This suspension is fed via line (4) to the second polymerization reactor (5) where further polymerization occurs. In some instances, fresh comonomer or further components of the reaction mixture are fed to reactor (5) via one or more feeding lines (6). In some instances, directly recycled mother liquor is fed to reactor (5) via line (43).

The suspension of reactor (5) is thereafter fed via line (7) to the third polymerization reactor (8) wherein additional polymerization is carried out. One or more feeding lines (9) allow supplementary feeding of comonomer or further components of the reaction mixture to reactor (8). Within polymerization reactor (8), further polymerization occurs. In some instances, directly recycled mother liquor is fed to reactor (8) via line (44).

The suspension of ethylene polymer particles in the suspension medium formed in reactor (8) is continuously transferred via line (10) to separator feed vessel (11). The suspension is then passed via line (12) to centrifuge (13), where the suspension is separated in solid ethylene polymer particles and mother liquor, that is, recovered liquid suspension medium.

The isolated wet ethylene polymer particles are transferred via line (20) to a powder dryer (21). For removing residual parts of the suspension medium, which is primarily hexane, from the ethylene polymer particles, hot nitrogen is introduced into powder dryer (21) through one or more lines (22). Nitrogen, which has taken up the evaporated parts of the suspension medium, primarily hexane, is conveyed via line (23) to a cyclone (24) and then via line (25) to scrubber (26). For recovering hexane from the nitrogen stream conveyed to scrubber (26), a cooled liquid phase is fed into scrubber (26) at position (27). The introduced liquid is then withdrawn from scrubber (26) together with washed-out hexane through line (28) forming a liquid hexane recover stream. A part of this hexane recover stream is recycled by pump (29) via lines (30) and (31) through heat exchanger (32) to scrubber (26) to be fed at position (27). The remainder of the hexane recover stream is transferred via line (33) to separator feed vessel (11). Nitrogen depleted in hexane leaves scrubber (26) at the top via line (34). Dried ethylene polymer particles are discharged from powder dryer (21) via line (36) and conveyed to a vessel for treating the ethylene polymer particles with a nitrogen/steam gas mixture and finally to a pelletizing unit (not shown).

The mother liquor obtained in centrifuge (13) is transferred via line (40) to a mother liquor collecting vessel (41). From there and in some instances, mother liquor is recycled by pump (42) via lines (43) and (44) to polymerization reactor (5) and/or polymerization reactor (8).

For work-up, mother liquor is branched off line (43) and transferred via line (50) to mother liquor tank (51). From there, mother liquor is transferred by pump (52) via line (53) to an evaporator (54). Line (55) which branches off line (50), allows feed of mother liquor directly from mother liquor collecting vessel (41) to evaporator (54) without passing mother liquor tank (51).

Evaporator (54) is designed as circulation evaporator which is operated by circulating the liquid phase to be evaporated through heat exchanger (56), wherein the liquid phase is partly vaporized. The vaporized fractions of the mother liquor are withdrawn from the top of evaporator (54) via line (57), condensed in heat exchanger (58) and transferred into a distillation column feeding vessel (59). From there, the condensed vaporized fractions of the mother liquor are pumped by pump (60) via line (61) into a distillation column (62).

Distillation column (62) is operated by branching off a part of the bottom stream withdrawn from distillation column (62) via line (63) and passing the branched-off part of the bottom stream through heat exchanger (64), therein partly vaporizing this stream and returning the heated and partly vaporized part of the bottom stream via line (65) to distillation column (62). The remainder of the bottom stream withdrawn from distillation column (62), which is predominantly hexane, is pumped by pump (66) via line (67) to a hexane purification unit (68) and then via line (69) to a hexane collecting vessel (70). From there, the purified hexane is recycled by pump (71) via line (2) as diluent to polymerization reactor (1). Low boiling point components are withdrawn from the top of distillation column (62) via line (72).

A liquid phase enriched in higher boiling point fractions of the mother liquor is withdrawn from the bottom of evaporator (54) via line (80) and transferred to a wax separator vessel (81) which is operated by injecting steam via line (82) directly into wax separator vessel (81). Liquid wax is withdrawn from the bottom of wax separator vessel (81) via line (83) and conveyed to an incineration unit (not shown) or to a solidifying unit or liquid shipping unit (not shown). In some instances, the incineration unit (not shown) is used to generate steam.

The gaseous fractions obtained in wax separator vessel (81), which are made from or containing primarily hexane and water, are withdrawn from the top of wax separator vessel (81) via line (84), condensed in heat exchanger (85) and transferred into a liquid-liquid separation vessel (86). In some instances, further condensed hexane/water mixtures obtained at other positions of the polymerization process are transferred into the liquid-liquid separation vessel (86) via line (91). In some instances, the further condensed hexane/water mixtures are condensed hexane/water mixture withdrawn from the powder treatment vessel.

Water is withdrawn from the liquid-liquid separation vessel (86) via line (87) and transferred to a wastewater system (not shown). The hexane phase is withdrawn from the liquid-liquid separation vessel (86) via line (88) and transferred by pump (89) via line (90) to mother liquor tank (51).

Figure 2:
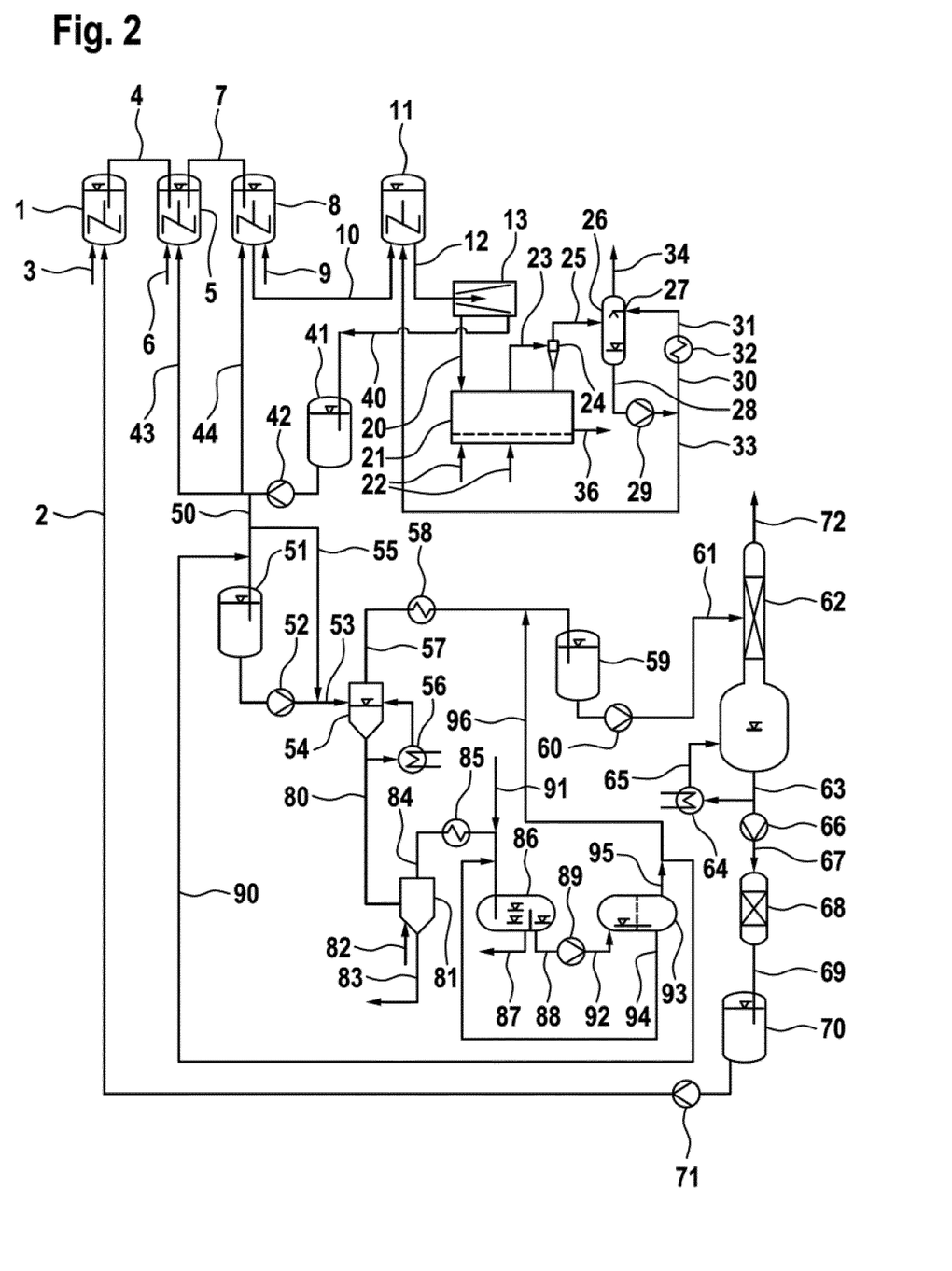
FIG. 2 is a schematic of a process for preparing ethylene polymers in suspension.

FIG. 2 is a schematic of a process for preparing ethylene polymers in suspension.

The process of FIG. 2 is for preparing multimodal ethylene polymers in a series of three polymerization reactors using hexane as diluent identical with the FIG. 1 process, except that the hexane phase withdrawn from the liquid-liquid separation vessel (86) via line (88) is not transferred by pump (89) via line (90) to mother liquor tank (51) but is transferred by pump (89) via a line (92) to a second liquid-liquid separation vessel (93). Water is withdrawn from the second liquid-liquid separation vessel (93) via line (94) and returned to the liquid-liquid separation vessel (86). The hexane phase is withdrawn from the second liquid-liquid separation vessel (93) via line (95) and a major portion of this hexane phase is transferred via line (96) directly to the distillation column (62). In some instances, line (90) is used to transfer the hexane phase withdrawn from the second liquid-liquid separation vessel (93) to mother liquor tank (51).

While multiple embodiments are disclosed, still other embodiments will become apparent to those skilled in the art from the following detailed description. As will be apparent, certain embodiments, as disclosed herein, are capable of modifications in various aspects, without departing from the spirit and scope of the claims as presented herein. Accordingly, the drawings and detailed description are to be regarded as illustrative in nature and not restrictive.

EXAMPLES

Comparative Example A

Ethylene was polymerized in a continuous process in three reactors arranged in series as shown in FIG. 1. A Ziegler catalyst component was prepared as disclosed in Patent Cooperation Treaty Publication No. WO 91/18934, Example 2 and having there, the operative number 2.2. The Ziegler catalyst component was fed into the first reactor (1) in an amount of 2.6 mol/h with respect to the titanium content of the catalysts compound, together with 69 mol/h of triethylaluminum, as well as hexane as diluent, ethylene, and hydrogen. The amount of ethylene (=24.1 t/h) and the amount of hydrogen (=21.7 kg/h) were adjusted so that the percentage proportion of ethylene and of hydrogen measured in the gas space of the first reactor were 20% by volume of ethylene and 62% by volume of hydrogen. The remainder was a mixture of nitrogen and vaporized diluent.

The polymerization in the first reactor (1) was carried out at 84° C.

The suspension from the first reactor (1) was then transferred into the second reactor (5), wherein the percentage proportion of hydrogen in the gas phase was reduced to 0.5% by volume. An amount of 12.8 t/h of ethylene was added to this reactor together with an amount of 397 kg/h of 1-butene. The amount of hydrogen was reduced by way of intermediate H2 depressurization. 64% by volume of ethylene, 0.5% by volume of hydrogen, and 6.0% by volume of 1-butene were measured in the gas phase of the second reactor. The remainder was a mixture of nitrogen and vaporized diluent.

The polymerization in the second reactor (5) was carried out at 85° C.

The suspension from the second reactor (5) was transferred to the third reactor (8) using further intermediate H2 depressurization to reduce the amount of hydrogen to less than 0.08% by volume in the gas space of the third reactor.

An amount of 10.3 t/h of ethylene was added to the third reactor (8) together with an amount of 476 kg/h of 1-butene. 72% by volume of ethylene, 0.05% by volume of hydrogen, and 6.8% by volume of 1-butene were measured in the gas phase of the third reactor. The remainder was a mixture of nitrogen and vaporized diluent.

The polymerization in the third reactor (8) was carried out at a pressure at 84° C.

The suspension from the third reactor (8) was transferred to separator feed vessel (11).

The work-up of the suspension discharged from the separator feed vessel (11) via line (12). The suspension was separated in centrifuge (13) in solid ethylene polymer particles and mother liquor. The isolated wet ethylene polymer particles were dried in powder dryer (21) by a stream of hot nitrogen. Evaporated parts of the hexane, which were removed from the wet ethylene polymer particles in powder dryer (21), were recovered by washing the gas stream leaving the powder dryer (21) in scrubber (26). The recovered liquid phase was transferred back to separator feed vessel (11) via line (33).

The mother liquor obtained in centrifuge (13) was partly recycled to the second and third polymerization reactors (5) and (8) and partly worked up by transference via line (53) to an evaporator (54), wherein the liquid phase was partly vaporized. Evaporator (54) was a circulation evaporator operated by circulating the liquid phase to be evaporated through a heat exchanger (56). The vaporized fractions of the mother liquor were transferred via line (57) into a distillation column feeding vessel (59), and from there by pump (60) via line (61) into a distillation column (62), wherein low boiling point components were separated off. A part of the bottom stream of distillation column (62) which was predominantly hexane, passed through a hexane purification unit (68) and transferred to the first polymerization reactor (1) via line (2).

A liquid phase enriched in higher boiling point fractions of the mother liquor was withdrawn from the bottom of evaporator (54) via line (80) and transferred to a wax separator vessel (81) which was operated by directly injecting steam through line (82). The gaseous fractions obtained in wax separator vessel (81) were condensed and transferred into a liquid-liquid separation vessel (86) for being separated into water and a hexane phase. The obtained hexane phase was combined with the parts of the mother liquor to be worked up and transferred via line (53) to evaporator (54).

The flow rates and compositions of selected streams in the mother liquor work-up process are presented in Table 1.

TABLE 1

| stream in line | total flow [kg/h] | hexane [kg/h] | 1-butene [kg/h] | wax [kg/h] | water [kg/h] |
| --- | --- | --- | --- | --- | --- |
| 2  | 42 685  | 42 681  | 4     | 0   | 0 |
| 12 | 179 141 | 129 270 | 1 014 | 1 863 | 0 |
| 33 | 15 390  | 15 292  | 94    | 0   | 0 |
| 50 | 50 150  | 49 140  | 373   | 620 | 0 |
| 53 | 54 410  | 53 373  | 389   | 620 | 3 |
| 57 | 50 274  | 49 865  | 384   | 0   | 3 |
| 61 | 50 274  | 49 865  | 384   | 0   | 3 |
| 80 | 4 136   | 3 508   | 5     | 620 | 0 |
| 90 | 4 260   | 4 233   | 16    | 0   | 3 |

For evaporating the fractions of the mother liquor to be transferred into the distillation column (62), heat exchanger (56) was provided with steam having a thermal output of 7433 kW.

Example 1

The polymerization of Comparative Example A was repeated; however, the work-up of the suspension discharged from the separator feed vessel (11) via line (12) occurred as depicted in FIG. 2.

In contrast to the work-up carried out in Comparative Example A, the hexane phase withdrawn from the liquid-liquid separation vessel (86) was transferred to a second liquid-liquid separation vessel (93). The hexane phase withdrawn from the second liquid-liquid separation vessel (93) was not transferred completely to mother liquor tank (51) but the major portion of the hexane phase was transferred via line (96) into distillation column feeding vessel (59) and a small portion of the hexane phase withdrawn from the second liquid-liquid separation vessel (93) was transferred to mother liquor tank (51) via line (90).

The flow rates and compositions of selected streams in the mother liquor work-up process are presented in Table 2.

TABLE 2

| stream in line | total flow [kg/h] | hexane [kg/h] | 1-butene [kg/h] | wax [kg/h] | water [kg/h] |
| --- | --- | --- | --- | --- | --- |
| 2  | 42 685  | 42 681  | 4     | 0   | 0 |
| 12 | 179 141 | 129 270 | 1 014 | 1 863 | 0 |
| 33 | 15 390  | 15 292  | 94    | 0   | 0 |
| 50 | 50 150  | 49 140  | 373   | 620 | 0 |
| 53 | 50 585  | 49 563  | 374   | 620 | 0 |
| 57 | 46 449  | 46 055  | 369   | 0   | 0 |
| 61 | 50 274  | 49 865  | 384   | 0   | 0 |
| 80 | 4 136   | 3 508   | 5     | 620 | 0 |
| 90 | 435     | 423     | 1     | 0   | 0 |
| 96 | 3 825   | 3 810   | 15    | 0   | 0 |

For evaporating the fractions of the mother liquor to be transferred into the distillation column (62), heat exchanger (56) was provided with steam having a thermal output of 6910 kW. With respect to Comparative Example A, the reduced flow of mother liquor to heat exchanger (56) allowed a 7% reduction of energy supplied to heat exchanger (56) without a reduction in the throughput of the distillation column (62).

What is claimed is:

1. A process for preparing an ethylene polymer in a suspension polymerization in a polymerization reactor or a series of polymerization reactors comprising the steps of:
    polymerizing ethylene or copolymerizing ethylene and one or more $C_3$-$C_{12}$-1-alkenes at temperatures of from 40 to 150° C. and pressures of from 0.1 to 20 MPa in the presence of a polymerization catalyst and forming a suspension of ethylene polymer particles in a suspension medium comprising a hydrocarbon diluent,
    transferring the suspension of ethylene polymer particles into a solid-liquid separator,
    wherein the suspension is separated into wet ethylene polymer particles and mother liquor,
    transferring a first part of the mother liquor into a work-up section comprising an evaporator for producing a wax-depleted portion of the mother liquor, a diluent distillation unit for producing isolated diluent from the wax-depleted portion of the mother liquor, and a wax removal unit operated by direct steam distillation for removing wax from a hydrocarbon wax solution, wherein the wax removal unit produces a gaseous hydrocarbon and steam mixture which is condensed and then separated, within a first liquid-liquid separator, into an aqueous phase and a hydrocarbon phase, and
    recycling a first part of the isolated diluent produced in the diluent distillation unit to the polymerization reactor or the series of polymerization reactors, wherein a first part of the hydrocarbon phase obtained in the first liquid-liquid separator is transferred to the diluent distillation unit without passing the evaporator for producing the wax-depleted portion of the mother liquor.

2. The process of claim 1, wherein the first part of the hydrocarbon phase obtained in the first liquid-liquid separator is transferred to a second liquid-liquid separator and therein separated into a second aqueous phase and a second hydrocarbon phase and the second hydrocarbon phase is transferred to the diluent distillation unit.

3. The process of claim 2, wherein the second liquid-liquid separator is equipped with a coalescer.

4. The process of claim 2, wherein the aqueous phase withdrawn from the second liquid-liquid separation vessel is returned to the first liquid-liquid separation vessel.

5. The process of claim 1, wherein the wet ethylene polymer particles obtained in the solid-liquid separator are dried by contacting the particles with a gas stream, thereby forming a gas stream carrying a hydrocarbon load, and thereafter separating the hydrocarbon load from the gas stream, thereby forming a liquid hydrocarbon recover stream, and a first part of the hydrocarbon recover stream is transferred to the diluent distillation unit without passing the evaporator for producing the wax-depleted portion of the mother liquor.

6. The process of claim 5, wherein the hydrocarbon recover stream transferred to the diluent distillation unit is passed through a filter before being introduced into the diluent distillation unit.

7. The process of claim 6, wherein the filter is a backwash filter.

8. The process of claim 5, wherein the ethylene polymer particles, which are separated from the hydrocarbon recover stream by the backwash filter, are transferred by a part of the hydrocarbon recover stream to the suspension of ethylene polymer particles upstream of the solid-liquid separator.

9. The process of claim 5, wherein the hydrocarbon recover stream is formed by contacting the gas stream carrying the hydrocarbon load with a cooled liquid phase in a scrubber and withdrawing the hydrocarbon recover stream from the bottom of the scrubber, and the cooled liquid phase is a cooled part of the hydrocarbon recover stream withdrawn from the bottom of the scrubber.

10. The process of claim 1, wherein the prepared ethylene polymer is a multimodal ethylene copolymer.

11. The process of claim 10, wherein the preparation of the ethylene polymer is carried out in a series of polymerization reactors and an ethylene homopolymer is prepared in one of the polymerization reactors.

12. The process of claim 11, wherein the ethylene homopolymer is prepared in the first polymerization reactor of the series of polymerization reactors and a copolymer of ethylene is prepared in a subsequent polymerization reactor.

13. A process for preparing a multimodal ethylene polymer in a suspension polymerization in a series of polymerization reactors, wherein an ethylene homopolymer is prepared in the first polymerization reactor of the series of polymerization reactors and a copolymer of ethylene is prepared in a subsequent polymerization reactor, the process comprising the steps of:

polymerizing ethylene or copolymerizing ethylene and one or more $C_3$-$C_{12}$-1-alkenes at temperatures of from 40 to 150° C. and pressures of from 0.1 to 20 MPa in the presence of a polymerization catalyst and forming a suspension of ethylene polymer particles in a suspension medium comprising a hydrocarbon diluent, transferring the suspension of ethylene polymer particles into a solid-liquid separator, wherein the suspension is separated into wet ethylene polymer particles and mother liquor, transferring a first part of the mother liquor into a work-up section comprising an evaporator for producing a wax-depleted portion of the mother liquor, a diluent distillation unit for producing isolated diluent from the wax-depleted portion of the mother liquor, and a wax removal unit operated by direct steam distillation for removing wax from a hydrocarbon wax solution, wherein the wax removal unit produces a gaseous hydrocarbon and steam mixture which is condensed and then separated, within a first liquid-liquid separator, into an aqueous phase and a hydrocarbon phase, and recycling a first part of the isolated diluent produced in the diluent distillation unit to the polymerization reactor or the series of polymerization reactors, wherein a first part of the hydrocarbon phase obtained in the first liquid-liquid separator is transferred to the diluent distillation unit without passing the evaporator for producing the wax-depleted portion of the mother liquor.

14. The process of claim 13, wherein the first part of the hydrocarbon phase obtained in the first liquid-liquid separator is transferred to a second liquid-liquid separator and therein separated into a second aqueous phase and a second hydrocarbon phase and the second hydrocarbon phase is transferred to the diluent distillation unit.

15. The process of claim 14, wherein the second liquid-liquid separator is equipped with a coalescer.

16. The process of claim 13, wherein the wet ethylene polymer particles obtained in the solid-liquid separator are dried by contacting the particles with a gas stream, thereby forming a gas stream carrying a hydrocarbon load, and thereafter separating the hydrocarbon load from the gas stream, thereby forming a liquid hydrocarbon recover stream, and a first part of the hydrocarbon recover stream is transferred to the diluent distillation unit without passing the evaporator for producing the wax-depleted portion of the mother liquor.

17. The process of claim 16, wherein the hydrocarbon recover stream transferred to the diluent distillation unit is passed through a filter before being introduced into the diluent distillation unit.

18. The process of claim 17, wherein the filter is a backwash filter.

19. The process of claim 18, wherein the ethylene polymer particles, which are separated from the hydrocarbon recover stream by the backwash filter, are transferred by a part of the hydrocarbon recover stream to the suspension of ethylene polymer particles upstream of the solid-liquid separator.

* * * * *